United States Patent
Ikezawa et al.

(10) Patent No.: US 12,358,506 B2
(45) Date of Patent: Jul. 15, 2025

(54) VEHICLE DECELERATION ASSISTANCE APPARATUS AND METHOD, AND COMPUTER-READABLE STORAGE MEDIUM STORING VEHICLE DECELERATION ASSISTANCE PROGRAM

(71) Applicant: TOYOTA JIDOSHA KABUSHIKI KAISHA, Toyota (JP)

(72) Inventors: Yuta Ikezawa, Toyota (JP); Kohei Tochigi, Shizuoka-ken (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 165 days.

(21) Appl. No.: 18/333,053

(22) Filed: Jun. 12, 2023

(65) Prior Publication Data

US 2024/0075932 A1    Mar. 7, 2024

(30) Foreign Application Priority Data

Sep. 5, 2022    (JP) ................. 2022-140839

(51) Int. Cl.
  *B60W 30/18*    (2012.01)
  *B60Q 1/34*    (2006.01)

(52) U.S. Cl.
  CPC ....... *B60W 30/18154* (2013.01); *B60Q 1/346* (2013.01); *B60W 30/18159* (2020.02); *B60W 2520/00* (2013.01); *B60W 2555/60* (2020.02)

(58) Field of Classification Search
  CPC ..... B60W 30/18154; B60W 30/18159; B60W 2555/60; B60W 2520/00; B60W 10/18; B60W 2520/10; B60W 2540/20; B60W 30/09; B60W 30/0953; B60W 30/0956; B60W 50/14; B60Q 1/346
  See application file for complete search history.

(56) References Cited

U.S. PATENT DOCUMENTS

| | | | |
|---|---|---|---|
| 8,355,851 B2 | 1/2013 | Inoue et al. |
| 8,370,040 B2 | 2/2013 | Inoue et al. |
| 8,417,430 B2 | 4/2013 | Saek |
| 8,548,709 B2 | 10/2013 | Morita |
| 8,768,597 B2 | 7/2014 | Kagawa |
| 9,174,643 B2 | 11/2015 | Aso |
| 10,017,178 B2 | 7/2018 | Morimoto et al. |

(Continued)

FOREIGN PATENT DOCUMENTS

JP    2020-004333 A    1/2020

*Primary Examiner* — Yufeng Zhang
(74) *Attorney, Agent, or Firm* — Sughrue Mion, PLLC

(57) ABSTRACT

A vehicle deceleration assistance apparatus executes a deceleration assistance control before a vehicle arrives at a target point. The apparatus executes the deceleration assistance control, setting a deceleration assistance level to a first level when a first condition is satisfied, blinkers are activated, and a second condition is satisfied. The first condition is a condition that a target point distance between the vehicle and the target point is equal to or shorter than a first distance. The second condition is a condition that the target point distance is equal to or longer than a second distance shorter than the first distance. The apparatus executes the deceleration assistance control, setting the deceleration assistance level to a second level lower than the first level when the first condition is satisfied, the blinkers are activated, and the second condition is not satisfied.

7 Claims, 5 Drawing Sheets

(56) References Cited

U.S. PATENT DOCUMENTS

| | | |
|---|---|---|
| 10,118,617 B2 | 11/2018 | Urano et al. |
| 10,486,698 B2 | 11/2019 | Masui et al. |
| 2013/0218462 A1* | 8/2013 | Miyamoto ............ G01C 21/34 |
| | | 701/527 |
| 2019/0295419 A1 | 9/2019 | Tosa et al. |
| 2020/0001875 A1 | 1/2020 | Kato et al. |
| 2020/0094732 A1* | 3/2020 | Onishi .................. B60Q 1/508 |

* cited by examiner

VEHICLE DECELERATION ASSISTANCE APPARATUS AND METHOD, AND COMPUTER-READABLE STORAGE MEDIUM STORING VEHICLE DECELERATION ASSISTANCE PROGRAM

CROSS-REFERENCE TO RELATED APPLICATIONS

This application claims priority to Japanese patent application No. JP 2022-140839 filed on Sep. 5, 2022, the content of which is hereby incorporated by reference in its entirety.

BACKGROUND

Field

The invention relates to a vehicle deceleration assistance apparatus, a vehicle deceleration assistance method, and a computer-readable storage medium storing a vehicle deceleration assistance program.

Description of the Related Art

There is known a vehicle deceleration assistance apparatus which executes a deceleration assistance control to assist a deceleration of a vehicle carried out by a driver of the vehicle by autonomously decelerating the vehicle when the vehicle arrives at a point near a traffic intersection. As this type of the known vehicle deceleration assistance apparatus, there is known a vehicle deceleration assistance apparatus which determines that the vehicle will turn left or right at the traffic intersection and execute the deceleration assistance control when a deceleration assistance condition becomes satisfied in response to (i) blinkers of the vehicle being activated, and (ii) a turning direction of the vehicle indicated by the activated blinkers corresponding to an allowed moving direction of a traffic lane in which the vehicle moves when the vehicle arrives at the point near the traffic intersection (for example, see JP 2020-4333 A1).

When the vehicle arrives at a point close to the traffic intersection, the driver may activate the blinkers. In this case, when the turning direction of the vehicle indicated by the activated blinkers corresponds to an allowed moving direction of the moving lane in which the vehicle moves, the deceleration assistance condition becomes satisfied. Thus, the known vehicle driving assistance apparatus executes the deceleration assistance control. However, when the driver has an intension to change traffic lanes and then, pass through the traffic intersection straight, the driver activates the blinkers for changing the traffic lanes. In this case, the driver activates the blinkers not for turning the vehicle left or right. In this case, when the deceleration assistance control is executed, and the vehicle is decelerated, it is not suitable for the vehicle passing through the traffic intersection straight. Therefore, it is not always suitable that the deceleration assistance control is executed in response to the deceleration assistance condition becoming satisfied.

SUMMARY

An object of the invention is to provide a vehicle deceleration assistance apparatus which can execute the deceleration assistance control when the vehicle arrives at the point near a point such as the traffic intersection where the vehicle can turn left or right.

A vehicle deceleration assistance apparatus according to the invention comprises an electronic control unit configured to execute a deceleration assistance control to assist a deceleration of a vehicle before the vehicle arrives at a deceleration assistance target point where the vehicle can turn left or right. The electronic control unit is configured to execute the deceleration assistance control, setting a deceleration assistance level of assisting the deceleration of the vehicle by the deceleration assistance control to a first level when a first condition is satisfied, blinkers of the vehicle are activated, and a second condition is satisfied. The first condition is a condition that a target point distance between the vehicle and the deceleration assistance target point is equal to or shorter than a first distance. The second condition is a condition that the target point distance is equal to or longer than a second distance shorter than the first distance. The electronic control unit is further configured to execute the deceleration assistance control, setting the deceleration assistance level to a second level lower than the first level when the first condition is satisfied, the blinkers are activated, and the second condition is not satisfied.

As described above, an operator of the vehicle may activate the blinkers when the vehicle arrives at a point close to the deceleration assistance target point. In this case, the deceleration assistance control of the normal deceleration assistance level should not be executed.

With the vehicle deceleration assistance apparatus according to the invention, when the operator of the vehicle activates the blinkers, and the vehicle arrives at the point close to the deceleration assistance target point, that is, the target point distance is shorter than the second distance, the second condition is not satisfied and as a result, the deceleration assistance control of the low deceleration assistance level (i.e., the second level) is executed. On the other hand, when the operator of the vehicle activates the blinkers, and the vehicle does not arrive at the point close to the deceleration assistance target point, that is, the target point distance is equal to or shorter than the first distance and equal to or longer than the second distance, the second condition is satisfied and as a result, the deceleration assistance control of the high deceleration assistance level (i.e., the first level) is executed. Thus, the deceleration assistance control is suitably executed when the vehicle arrives at the point near the deceleration assistance target point, i.e. a point such as a traffic intersection where the vehicle can turn left or right.

According to an aspect of the invention, the electronic control unit may be configured to increase the second distance when the first condition is satisfied, the blinkers are activated, and a traffic light ahead of the vehicle lights a yellow light.

As described above, the operator of the vehicle may activate the blinkers when the operator has an intension to change the traffic lanes and then, pass through the deceleration assistance target point straight when the vehicle arrives at the point close to the deceleration assistance target point. In this case, when the traffic light lights the yellow light, the operator of the vehicle may pass through the deceleration assistance target point without decelerating the vehicle. In this case, the deceleration assistance control of the high deceleration assistance level should not be executed.

With the vehicle deceleration assistance apparatus according to this aspect of the invention, when the first condition is satisfied, the blinkers are activated, and the traffic light lights the yellow light, the second distance is increased. Thus, when the vehicle is relatively away from the deceleration assistance target point, the second condition is unlikely to become satisfied. That is, when the traffic light lights the yellow light, the second condition is unlikely to become satisfied and as a result, the deceleration assistance control of the high deceleration assistance level (i.e., the first level) is unlikely to be executed. Thus, the deceleration assistance control is suitably executed when the vehicle arrives at the point near the deceleration assistance target point, i.e. the point such as the traffic intersection where the vehicle can turn left or right.

According to another aspect of the invention, the electronic control unit may be configured to increase the second distance when the first condition is satisfied, the blinkers are activated, and there is an entrance of a parking lot over the deceleration assistance target point.

When there is the entrance of the parking lot over the deceleration assistance target point, and the operator of the vehicle has an intension to enter the vehicle into the parking lot, the operator of the vehicle activates the blinkers when the vehicle arrives at a point close to the deceleration assistance target point. In this case, the deceleration assistance control of the high deceleration assistance level should not be executed.

With the vehicle deceleration assistance apparatus according to this aspect of the invention, when the first condition is satisfied, the blinkers are activated, and there is the entrance of the parking lot over the deceleration assistance target point, the second distance is increased. Thus, when the vehicle is relatively away from the deceleration assistance target point, the second condition is unlikely to become satisfied. That is, when there is the entrance of the parking lot over the deceleration assistance target point, the second condition is unlikely to become satisfied and as a result, the deceleration assistance control of the high deceleration assistance level (i.e., the first level) is unlikely to be executed. Thus, the deceleration assistance control is suitably executed when the vehicle arrives at the point near the deceleration assistance target point, i.e. the point such as the traffic intersection where the vehicle can turn left or right.

According to further another aspect of the invention, the electronic control unit may be configured to execute the deceleration assistance control, setting the deceleration assistance level to a third level lower than the first level when the first condition is not satisfied, and the blinkers are activated.

When there is the entrance of the parking lot before the deceleration assistance target point, and the operator of the vehicle has an intension to enter the vehicle into the parking lot, the operator of the vehicle activates the blinkers at a point away from the deceleration assistance target point. In this case, the deceleration assistance control of the high deceleration assistance level should not be executed.

With the vehicle deceleration assistance apparatus according to this aspect of the invention, when the blinkers are activated at the point away from the deceleration assistance target point, that is, the first condition is not satisfied, the deceleration assistance control of the low deceleration assistance level (i.e., the third level) is executed. Thus, the deceleration assistance control is suitably executed when the vehicle arrives at the point near the deceleration assistance target point, i.e. the point such as the traffic intersection where the vehicle can turn left or right.

According to further another aspect of the invention, the electronic control unit may be configured to increase the first distance such that the first distance for a higher moving speed of the vehicle is longer than the first distance for the lower moving speed of the vehicle.

When the vehicle arrives at the point near the deceleration assistance target point, and the moving speed of the vehicle is high, the operator of the vehicle starts to decelerate the vehicle at an earlier timing, compared with when the vehicle arrives at the point near the deceleration assistance target point, and the moving speed of the vehicle is low.

With the vehicle deceleration assistance apparatus according to this aspect of the invention, the first distance is increased such that the first distance for the higher moving speed of the vehicle is longer than the first distance for the lower moving speed of the vehicle. Therefore, when the moving speed of the vehicle is high, the first condition becomes satisfied when the vehicle moves at a point away from the deceleration assistance target point. Thus, the deceleration assistance control is likely to start to be executed at an earlier timing. Thus, the deceleration assistance control is suitably executed when the vehicle arrives at the point near the deceleration assistance target point, i.e. the point such as the traffic intersection where the vehicle can turn left or right.

A vehicle deceleration assistance method according to the invention is a method of executing a deceleration assistance control to assist a deceleration of a vehicle before the vehicle arrives at a deceleration assistance target point where the vehicle can turn left or right. The vehicle deceleration assistance method comprises a step of executing the deceleration assistance control, setting a deceleration assistance level of assisting the deceleration of the vehicle by the deceleration assistance control to a first level when a first condition is satisfied, blinkers of the vehicle are activated, and a second condition is satisfied. The first condition is a condition that a target point distance between the vehicle and the deceleration assistance target point is equal to or shorter than a first distance. The second condition is a condition that the target point distance is equal to or longer than a second distance shorter than the first distance. The vehicle deceleration assistance method further comprises a step of executing the deceleration assistance control, setting the deceleration assistance level to a second level lower than the first level when the first condition is satisfied, the blinkers are activated, and the second condition is not satisfied.

With the vehicle deceleration assistance method according to the invention, for the same reasons as the reasons described above, the deceleration assistance control is suitably executed when the vehicle arrives at the point near the deceleration assistance target point, i.e. the point such as the traffic intersection where the vehicle can turn left or right.

A computer-readable storage medium according to the invention stores a vehicle deceleration assistance program configured to execute a deceleration assistance control to assist a deceleration of a vehicle before the vehicle arrives at a deceleration assistance target point where the vehicle can turn left or right. The vehicle deceleration assistance program is configured to execute the deceleration assistance control, setting a deceleration assistance level of assisting the deceleration of the vehicle by the deceleration assistance control to a first level when a first condition is satisfied, blinkers of the vehicle are activated, and a second condition is satisfied. The first condition is a condition that a target point distance between the vehicle and the deceleration assistance target point is equal to or shorter than a first distance. The second condition is a condition that the target point distance is equal to or longer than a second distance shorter than the first distance. The vehicle deceleration assistance program is further configured to execute the deceleration assistance control, setting the deceleration assistance level to a second level lower than the first level when the first condition is satisfied, the blinkers are activated, and the second condition is not satisfied.

With the vehicle deceleration assistance program according to the invention, for the same reasons as the reasons described above, the deceleration assistance control is suitably executed when the vehicle arrives at the point near the deceleration assistance target point, i.e. the point such as the traffic intersection where the vehicle can turn left or right.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Below, a vehicle control apparatus including a vehicle deceleration assistance apparatus according to an embodiment of the invention will be described with reference to the drawings. It should be noted that examples described below are ones that vehicles are regulated by laws to move on the left side of a road. Therefore, when the vehicles are regulated by the laws to move on the right side of the road, terms "left" and "right" should be construed as "right" and "left", respectively.

Figure 1:
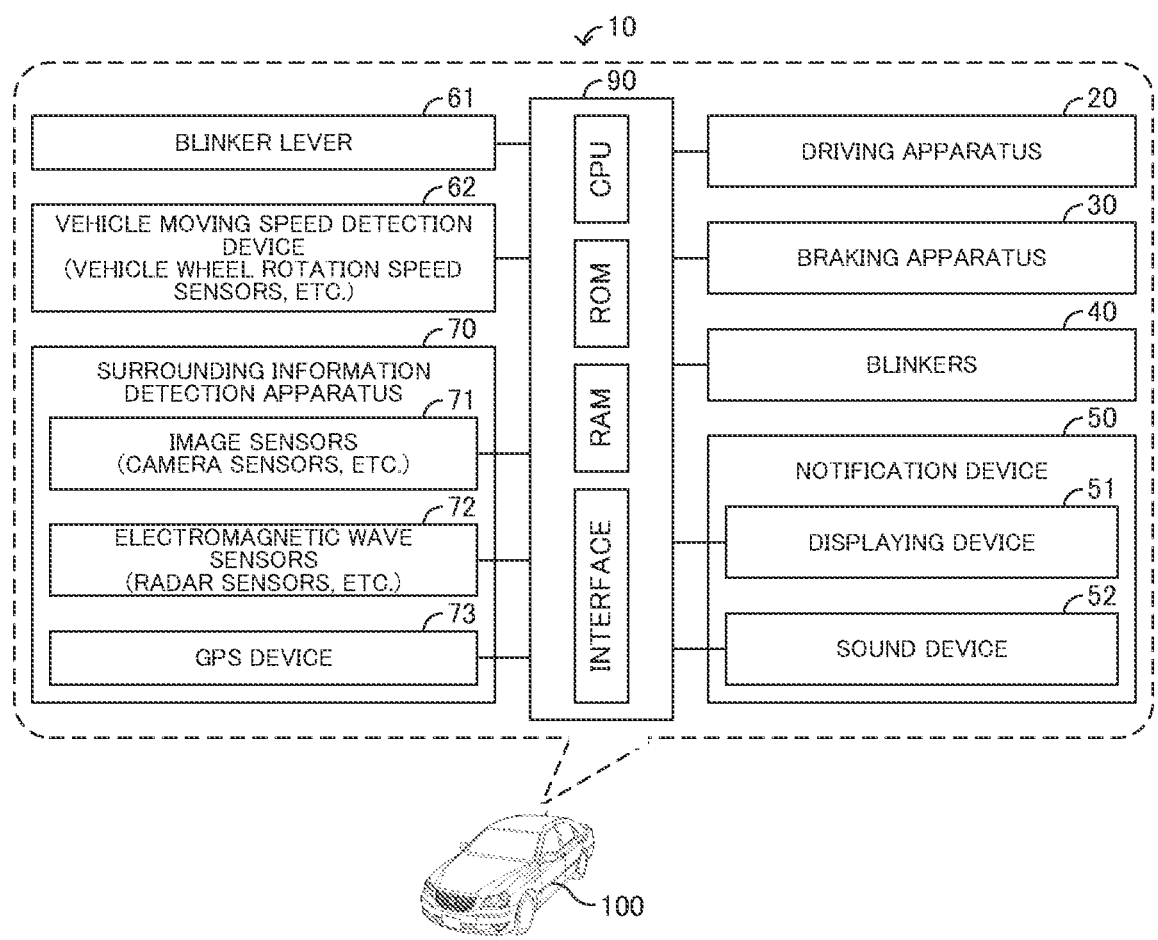
FIG. 1 is a view which shows a vehicle control apparatus including a vehicle deceleration assistance apparatus according to an embodiment of the invention.

As shown in FIG. 1, the vehicle control apparatus 10 according to the embodiment of the invention is installed on a vehicle 100. The vehicle control apparatus 10 includes an ECU 90.

The ECU 90 is an electronic control unit. The ECU 90 includes a microcomputer as a main component. The microcomputer includes a CPU, a ROM, a RAM, a non-volatile memory, and an interface. The CPU is configured or programmed to realize various functions by executing instructions, or programs, or routines stored in the ROM. In this embodiment, the vehicle control apparatus 10 includes one ECU. In this regard, the CPU may include ECUs and be configured to execute the processes by the ECUs, respectively.

A driving apparatus 20, a braking apparatus 30, blinkers 40, a notification device 50, a blinker lever 61, a vehicle moving speed detection device 62, and a surrounding information detection apparatus 70, are electrically connected to the ECU 90.

<Driving Apparatus>

The driving apparatus 20 is an apparatus which applies a driving force to the vehicle 100. The vehicle control apparatus 10 controls the driving force applied from the driving apparatus 20 to the vehicle 100.

<Braking Apparatus>

The braking apparatus 30 is an apparatus which applies a braking force to the vehicle 100. The vehicle control apparatus 10 decelerates the vehicle 100 by applying the braking force to the vehicle 100 from the braking apparatus 30.

<Blinkers>

Figure 2:
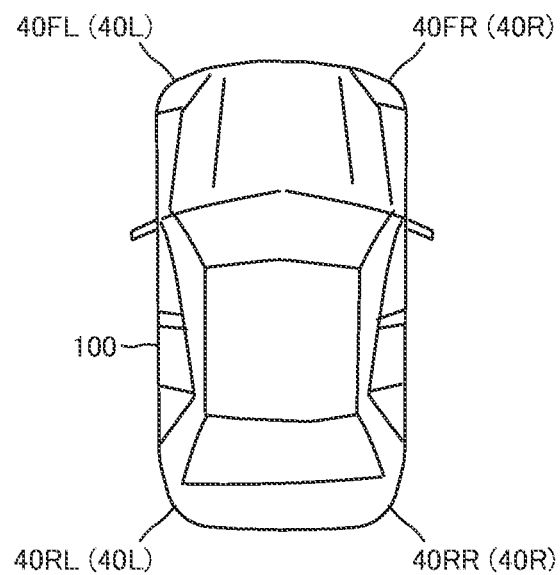
FIG. 2 is a view which shows blinkers of a vehicle.

The blinkers 40 are devices such as direction indicators which inform people outside of the vehicle 100 of a turning direction of the vehicle 100. In this embodiment, the blinkers 40 include right blinkers 40R and left blinkers 40L. As shown in FIG. 2, in this embodiment, the right blinkers 40R include a front right blinker 40FR and a rear right blinker 40RR. The front right blinker 40FR is mounted on a front right corner portion of the vehicle 100. The rear right blinker 40RR is mounted on a rear right corner portion of the vehicle 100. Further, the left blinkers 40L include a front left blinker 40FL and a rear left blinker 40RL. The front left blinker 40FL is mounted on a front left corner portion of the vehicle 100. The rear left blinker 40RL is mounted on a rear left corner portion of the vehicle 100. The right blinkers 40R are devices which inform the people outside of the vehicle 100 that the vehicle 100 turns in a right direction. The left blinkers 40L are devices which inform the people outside of the vehicle 100 that the vehicle 100 turns in a left direction.

The blinkers 40 are activated or deactivated by an operator of the vehicle 100. That is, the blinkers 40 change from an activated state to a deactivated state and vice versa. When the operator is a driver of the vehicle 100, the blinkers 40 are activated or deactivated by the driver operating a device such as a blinker lever provided on the vehicle 100. Further, when the operator is a remote operator, the blinkers 40 are activated or deactivated by the remote operator operating a device such as the blinker lever provided outside of the vehicle 100.

In this embodiment, the blinkers 40 are activated or deactivated by the driver of the vehicle 100 operating the blinker lever 61.

The operator of the vehicle 100 is the driver of the vehicle 100, i.e., a person who is in the vehicle 100 and directly drives the vehicle 100 or the remote operator of the vehicle 100, i.e., a person who is out of the vehicle 100 and remotely drives the vehicle 100.

<Notification Device>

The notification device 50 is a device which provides a notification to provide the operator of the vehicle 100 with various information. In this embodiment, the notification device 50 includes a displaying device 51 and a sound device 52.

The displaying device 51 is a device such as a display which displays various images. When the operator of the vehicle 100 is the driver of the vehicle 100, the displaying device 51 is a device such as a display installed on the vehicle 100. When the operator of the vehicle 100 is the remote operator of the vehicle 100, the displaying device 51 is a device such as the display installed in equipment by which the remote operator remotely drives the vehicle 100.

The vehicle control apparatus 10 proposes a deceleration of the vehicle 100 to the operator of the vehicle 100 by displaying an image to propose the deceleration of the vehicle 100 to the operator of the vehicle 100 by the displaying device 51.

The sound device 52 is a device such as a speaker which outputs various announcements. When the operator of the vehicle 100 is the driver of the vehicle 100, the sound device 52 is a device such as the speaker installed on the vehicle 100. When the operator of the vehicle 100 is the remote operator of the vehicle 100, the sound device 52 is a device such as the speaker installed in the equipment by which the remote operator remotely drives the vehicle 100.

The vehicle control apparatus 10 proposes the deceleration of the vehicle 100 to the operator of the vehicle 100 by outputting an announcement to propose the deceleration of the vehicle 100 to the operator of the vehicle 100 by the sound device 52.

<Vehicle Moving Speed Detection Device>

The vehicle moving speed detection device 62 is a device which detects an own vehicle moving speed V by vehicle wheel rotation speed sensors provided on vehicle wheels of the vehicle 100, respectively. The vehicle control apparatus 10 acquires the own vehicle moving speed V by the vehicle moving speed detection device 62.

<Surrounding Information Detection Apparatus>

The surrounding information detection apparatus 70 is an apparatus which acquires surrounding detection information IS. In this embodiment, the surrounding information detection apparatus 70 includes image sensors 71, electromagnetic wave sensors 72 and a GPS device 73.

The image sensors 71 are sensors which take views around the vehicle 100 and acquire image data. The vehicle control apparatus 10 acquires the image data as the surrounding detection information IS by the image sensors 71.

The electromagnetic wave sensors 72 are sensors which acquire object data, i.e., data on objects around the vehicle 100. The electromagnetic wave sensors 72 are, for example, radio wave sensors such as radar sensors such as millimeter wave radars, sound sensors such as ultrasonic wave sensors such as clearance sonars, and optical sensors such as laser radars such as LiDARs. The electromagnetic wave sensors 72 transmit radio waves. The electromagnetic wave sensors 72 receives reflected waves, i.e., the radio waves reflected by the objects. The vehicle control apparatus 10 acquires the object data as the surrounding detection information IS by the electromagnetic wave sensors 72.

The GPS device 73 includes a GPS receiver and a map database. The GPS receiver receives so-called GPS signals. The vehicle control apparatus 10 acquires the GPS signals by the GPS receiver, specifies a present position of the vehicle 100, i.e., position information or own vehicle position information on a position of the vehicle 100, and acquires map information on an area around the present position of the vehicle 100 as the surrounding detection information IS, based on the present position of the vehicle 100 and the map database. The map information includes information on positions of traffic intersections, allowed moving directions of traffic lanes of a road, etc.

In this regard, the surrounding information detection apparatus 70 may be configured to acquire road information transmitted from equipment at the side of the road as the surrounding detection information IS. Further, the surrounding information detection apparatus 70 may be configured to acquire signals transmitted from mobile terminals which pedestrians carry as the surrounding detection information IS.

<Operations of Vehicle Control Apparatus>

Next, operations of the vehicle control apparatus 10 will be described. When the vehicle 100 turns left or right at the traffic intersection, the operator of the vehicle 100 decelerates the vehicle 100 before the vehicle 100 arrives at the traffic intersection. The vehicle control apparatus 10 is configured to execute a deceleration assistance control to assist a deceleration of the vehicle 100 carried out by the operator when the operator predictively decelerates the vehicle 100. That is, the vehicle control apparatus 10 is configured to execute the deceleration assistance control to assist the deceleration of the vehicle 100 before the vehicle 100 arrives at a deceleration assistance target point such as a traffic intersection where the vehicle 100 is allowed to turn left or right.

In this embodiment, the deceleration assistance control includes at least one of an autonomous deceleration control and a deceleration notification control.

The autonomous deceleration control is a control to control the own vehicle moving speed V equal to or smaller than a predetermined speed at a point of time when the vehicle 100 arrives at the deceleration assistance target point such as the traffic intersection by autonomously decelerating the vehicle 100. Thus, when the deceleration assistance control is the autonomous deceleration control, the vehicle control apparatus 10 is one of apparatuses which perform an automatic driving or an autonomous driving of the vehicle 100.

Further, the deceleration notification control is a control to provide the operator of the vehicle 100 with a notification to propose decelerating the vehicle 100 to the operator of the vehicle 100 by the notification device 50. In particular, the deceleration notification control is a control to display an image to propose the deceleration of the vehicle 100 by the displaying device 51 and/or output an announcement to propose the deceleration of the vehicle 100 by the sound device 52.

Further, the deceleration notification control is a control to provide the operator of the vehicle 100 with a notification to notify the operator of the vehicle 100 that a person probably enters into an own vehicle moving lane from a blind spot ahead of the vehicle 100 by the notification device 50. In particular, the deceleration notification control is a control to display an image to notify the operator of the vehicle 100 that a person probably enters into the own vehicle moving lane from the blind spot ahead of the vehicle 100 by the displaying device 51 and/or output an announcement to notify the operator of the vehicle 100 that a person probably enters into the own vehicle moving lane from the blind spot ahead of the vehicle 100 by the sound device 52.

In this embodiment, the own vehicle moving lane is a traffic lane in which the vehicle 100 moves.

Further, the vehicle control apparatus 10 detects objects ahead of the vehicle 100 and pedestrians behind the objects, based on the surrounding detection information IS and/or known methods. In this embodiment, the objects which the vehicle control apparatus 10 detects, include vehicles and structures ahead of the vehicle 100. The structures include buildings and signboards.

<Detection of Deceleration Assistance Target Point>

Figure 3:
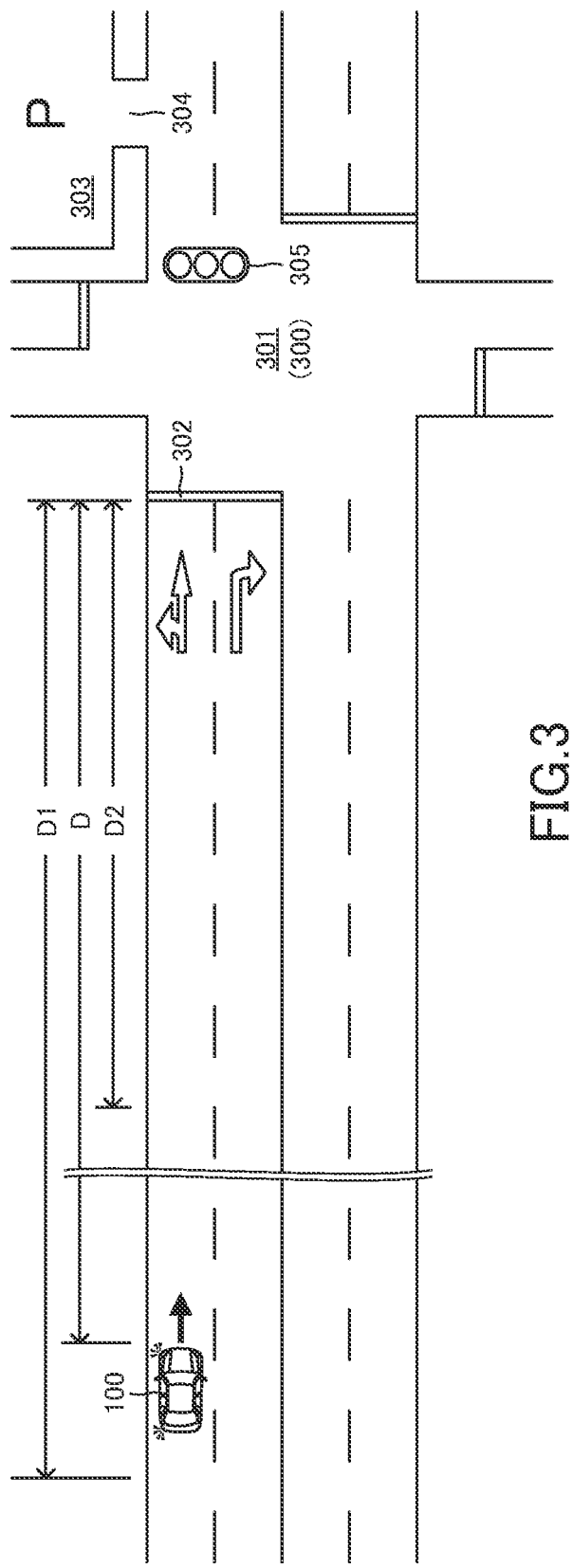
FIG. 3 is a view which shows a traffic intersection which is a deceleration assistance target point.

As shown in FIG. 3, the vehicle control apparatus 10 repeatedly detects the deceleration assistance target point 300 while the vehicle 100 moves. The deceleration assistance target point 300 is a point where the vehicle 100 can turn left or right. The deceleration assistance target point 300 is, for example, the traffic intersection 301 shown in FIG. 3.

The deceleration assistance target point 300 which the vehicle control apparatus 10 detects, is the deceleration assistance target point 300 such as the traffic intersection ahead of the vehicle 100. The vehicle control apparatus 10 detects the deceleration assistance target point 300, based on the surrounding detection information IS.

<Acquisition of Target Point Distance>

While the vehicle control apparatus 10 continues detecting the deceleration assistance target point 300, the vehicle control apparatus 10 repeatedly acquires a target point distance D. The target point distance D is a distance between the vehicle 100 and the deceleration assistance target point 300. In this embodiment, as shown in FIG. 3, the target point distance D is a distance between the vehicle 100 and a stop line 302 provided at the own vehicle moving lane before the deceleration assistance target point 300. The target point distance D may be a distance between the vehicle 100 and a center point of the deceleration assistance target point 300.

The vehicle control apparatus 10 acquires the target point distance D, based on the surrounding detection information IS.

<Determination of Assistance Determination Start Condition being Satisfied>

In addition, while the vehicle control apparatus 10 continues detecting the deceleration assistance target point 300, the vehicle control apparatus 10 determines whether an assistance determination start condition is satisfied. The assistance determination start condition (or a first condition) is a condition that the target point distance D is equal to or shorter than a predetermined distance or an assistance determination start distance D1.

In this embodiment, the assistance determination start distance D1 (or a first distance) is set to a reference distance. The reference distance is set, based on data on the target point distance D which the operator of the vehicle 100 or a standard operator starts to decelerate the vehicle 100 when the vehicle 100 arrives at the point near the deceleration assistance target point 300 at a predetermined moving speed. The reference distance increases as the own vehicle moving speed V increases with respect to the predetermined moving speed and decreases as the own vehicle moving speed V decreases with respect to the predetermined moving speed.

<Determination of Deceleration Assistance Condition being Satisfied>

When the vehicle control apparatus 10 determines that the assistance determination start condition is satisfied, the vehicle control apparatus 10 determines whether a deceleration assistance condition is satisfied. In this embodiment, the deceleration assistance condition is a condition that the blinkers 40 are activated. In other words, the deceleration assistance condition is a condition that the target point distance D is equal to or shorter than the assistance determination start distance D1, and the blinkers 40 are activated.

<Determination of Allowance Condition being Satisfied>

The operator of the vehicle 100 may activate the blinkers 40 when the vehicle 100 arrives at a point close to the deceleration assistance target point 300. In this case, the operator may activate the blinkers 40 when the operator has an intension to change traffic lanes and then, pass through the deceleration assistance target point 300 straight. Therefore, the operator may activate the blinkers 40 not for turning the vehicle 100 left or right at the deceleration assistance target point 300. In this case, when the deceleration assistance control is executed, and the vehicle 100 is decelerated, it is not suitable for the vehicle passing through the deceleration assistance target point 300 straight. Therefore, it is not always suitable that the deceleration assistance control is executed in response to the deceleration assistance condition becomes satisfied.

Accordingly, the vehicle control apparatus 10 determines whether an allowance condition is satisfied while the vehicle control apparatus 10 continues detecting the deceleration assistance target point 300. The allowance condition (or a second condition) is a condition that the target point distance D is equal to or longer than a predetermined distance or a deceleration assistance forbiddance distance D2. The deceleration assistance forbiddance distance D2 or the second distance is shorter than the assistance determination start distance D1. In this embodiment, the deceleration assistance forbiddance distance D2 increases as the own vehicle moving speed V increases.

<Execution of Deceleration Assistance Control>

When the deceleration assistance condition is satisfied, and the allowance condition is satisfied, the vehicle control apparatus 10 allows starting to execute the deceleration assistance control and as a result, executes the deceleration assistance control. On the other hand, when the deceleration assistance condition is satisfied, and the allowance condition is not satisfied, the vehicle control apparatus 10 forbids starting to execute the deceleration assistance control and as a result, does not execute the deceleration assistance control.

Further, when the deceleration assistance condition is not satisfied, the vehicle control apparatus 10 does not execute the deceleration assistance control. That is, when the assistance determination start condition is satisfied, and the blinkers 40 are not activated, the vehicle control apparatus 10 does not execute the deceleration assistance control.

Furthermore, when the assistance determination start condition is not satisfied, the vehicle control apparatus 10 does not execute the deceleration assistance control. That is, when the target point distance D is longer than the assistance determination start distance D1, the vehicle control apparatus 10 does not execute the deceleration assistance control, independently of whether the blinkers 40 are activated.

<Advantages>

With the vehicle control apparatus 10, when the vehicle 100 arrives at the point close to the deceleration assistance target point 300, that is, the target point distance D is shorter than the deceleration assistance forbiddance distance D2 when the operator of the vehicle 100 activates the blinkers 40, the allowance condition does not become satisfied and as a result, the deceleration assistance control is not executed. On the other hand, when the vehicle 100 does not arrive at the point close to the deceleration assistance target point 300, that is, the target point distance D is equal to or shorter than the assistance determination start distance D1 and equal to or longer the deceleration assistance forbiddance distance D2 when the operator of the vehicle 100 activates the blinkers 40, the allowance condition becomes satisfied and as a result, the deceleration assistance control is executed. Thus, the deceleration assistance control is suitably executed when the vehicle 100 arrives at the point near the deceleration assistance target point 300, i.e., a point such as the traffic intersection 301 where the vehicle 100 can turn left or right.

Figure 4:
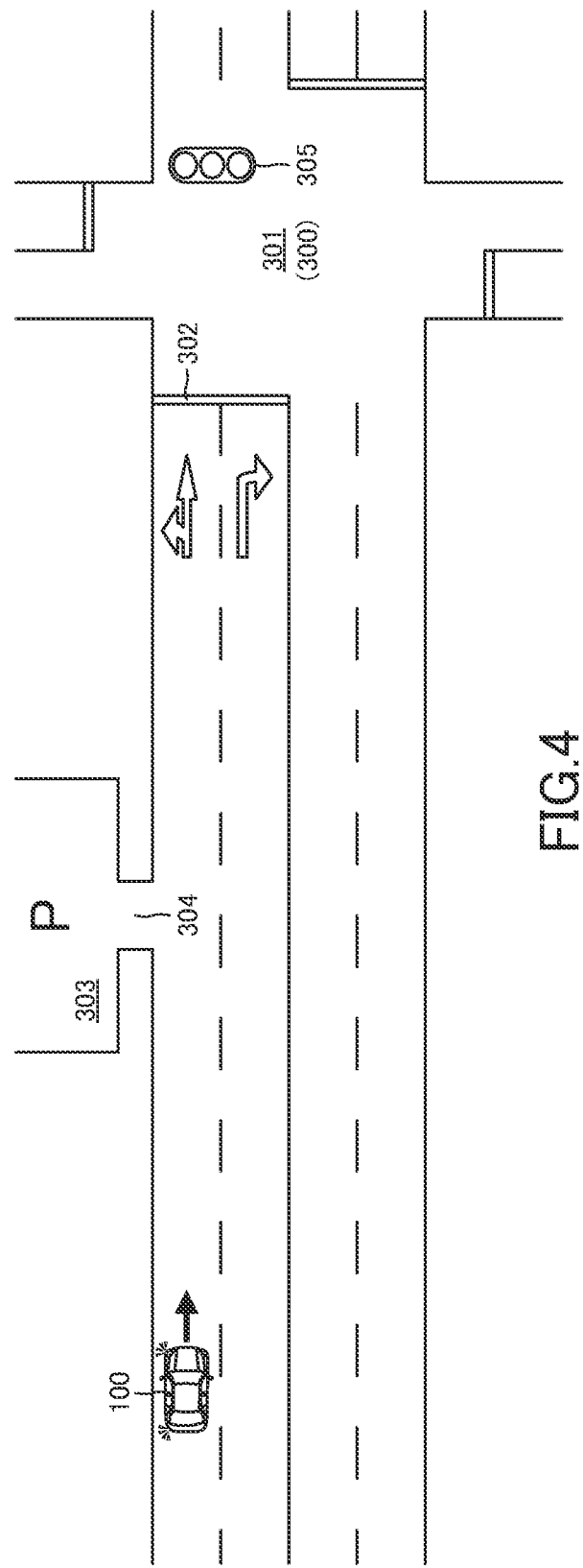
FIG. 4 is a view which shows a scene that there is a parking lot before the traffic intersection which is the deceleration assistance target point.

Further, as shown in FIG. 4, when there is an entrance 304 of a parking lot 303 before the deceleration assistance target point 300, and the operator of the vehicle 100 has an intension to enter the vehicle 100 into the parking lot 303, the operator of the vehicle 100 activates the blinkers 40 at a point away from the deceleration assistance target point 300. In this case, the deceleration assistance control should not be executed.

With the vehicle control apparatus 10, when the blinkers 40 are activated at the point away from the deceleration assistance target point 300, that is, when the assistance determination start condition is not satisfied, the deceleration assistance control is not executed. Thus, the deceleration assistance control is suitably executed when the vehicle 100 arrives at the point near the deceleration assistance target point 300, i.e., the point such as the traffic intersection 301 where the vehicle 100 can turn left or right.

<Setting of Deceleration Assistance Forbiddance Distance>

The operator of the vehicle 100 may activate the blinkers 40 when the vehicle 100 arrives at the point close to the deceleration assistance target point 300 since the vehicle 100 has an intension to change the traffic lanes and then, pass through the deceleration assistance target point 300 straight. In this case, when a traffic light 305 lights a yellow light, the operator of the vehicle 100 tries to pass through the deceleration assistance target point 300 without decelerating the vehicle 100. In this case, the deceleration assistance control should not be executed.

Accordingly, in this embodiment, the vehicle control apparatus 10 increases the deceleration assistance forbiddance distance D2 when the deceleration assistance condition becomes satisfied, and the traffic light 305 lights the yellow light. In this regard, the vehicle control apparatus 10 may increase the deceleration assistance forbiddance distance D2 by a constant value. Alternatively, the vehicle control apparatus 10 may increase the deceleration assistance forbiddance distance D2 such that the deceleration assistance forbiddance distance D2 for the higher own vehicle moving speed V is longer than the deceleration assistance forbiddance distance D2 for the lower own vehicle moving speed V. In particular, the vehicle control apparatus 10 may increase the deceleration assistance forbiddance distance D2 such that the deceleration assistance forbiddance distance D2 increases as the own vehicle moving speed V increases.

Thereby, the allowance condition does not become satisfied even when the vehicle 100 moves at the point relatively away from the deceleration assistance target point 300. That is, when the traffic light 305 lights the yellow light, the allowance condition is unlikely to become satisfied and as a result, the deceleration assistance control is unlikely to be executed. Thus, the deceleration assistance control is suitably executed when the vehicle 100 arrives at the point near the deceleration assistance target point 300, i.e. the point such as the traffic intersection 301 where the vehicle 100 can turn left or right.

In this embodiment, the traffic light 305 is a traffic light which is provided ahead of the vehicle 100 to regulate a moving of the vehicle 100. The vehicle control apparatus 10 detects the traffic light 305, based on the surrounding detection information IS and determines which the traffic light 305 lights, a red light, or a green light, or the yellow light.

Further, when the deceleration assistance control includes only the deceleration notification control, the vehicle control apparatus 10 may be configured not to increase the deceleration assistance forbiddance distance D2 even when the deceleration assistance condition becomes satisfied, and the traffic light 305 lights the yellow light.

When there is the entrance 304 of the parking lot 303 over the deceleration assistance target point 300, and the operator of the vehicle 100 has an intension to enter the vehicle 100 into the parking lot 303, the operator of the vehicle 100 may activate the blinkers 40 when the vehicle 100 arrives at a point close to the deceleration assistance target point 300. In this case, the deceleration assistance control should not be executed.

Accordingly, in this embodiment, the vehicle control apparatus 10 increases the deceleration assistance forbiddance distance D2 when there is the entrance 304 of the parking lot 303 over the deceleration assistance target point 300. In this regard, the vehicle control apparatus 10 may increase the deceleration assistance forbiddance distance D2 by a constant value. Alternatively, the vehicle control apparatus 10 may increase the deceleration assistance forbiddance distance D2 such that the deceleration assistance forbiddance distance D2 for the higher own vehicle moving speed V is longer than the deceleration assistance forbiddance distance D2 for the lower own vehicle moving speed V. In particular, the vehicle control apparatus 10 may increase the deceleration assistance forbiddance distance D2 such that the deceleration assistance forbiddance distance D2 increases as the own vehicle moving speed V increases.

In this regard, the vehicle control apparatus 10 may be configured to increase the deceleration assistance forbiddance distance D2 when there is the parking lot 303 over the deceleration assistance target point 300, and the left blinkers 40L are activated in place of increasing the deceleration assistance forbiddance distance D2 when there is the entrance 304 of the parking lot 303 over the deceleration assistance target point 300. Alternatively, the vehicle control apparatus 10 may be configured to increase the deceleration assistance forbiddance distance D2 when (i) there is the parking lot 303 over the deceleration assistance target point 300, (ii) the entrance 304 of the parking lot 303 is provided on the left side of the own vehicle moving lane, and (iii) the left blinkers 40L are activated.

Thereby, the deceleration assistance forbiddance distance D2 is increased when (i) the assistance determination start condition is satisfied, (ii) the blinkers 40 are activated, and (iii) there is the entrance 304 of the parking lot 303 over the deceleration assistance target point 300. Thus, the allowance condition does not become satisfied even when the vehicle 100 moves at the point relatively away from the deceleration assistance target point 300. That is, when there is the entrance 304 of the parking lot 303 over the deceleration assistance target point 300, the allowance condition is unlikely to become satisfied and as a result, the deceleration assistance control is unlikely to be executed. Thus, the deceleration assistance control is suitably executed when the vehicle 100 arrives at the point near the deceleration assistance target point 300, i.e. the point such as the traffic intersection 301 where the vehicle 100 can turn left or right.

In this embodiment, the vehicle control apparatus 10 detects the parking lot 303 and the entrance 304, based on the surrounding detection information IS.

It should be noted that the invention is not limited to the aforementioned embodiments, and various modifications can be employed within the scope of the invention.

For example, the vehicle control apparatus 10 may be configured to (i) execute the deceleration assistance control when the deceleration assistance condition and the allowance condition both becomes satisfied, and a forbiddance condition relating to the allowed moving direction is not satisfied, and (ii) forbid starting to execute the deceleration assistance control and as a result, keep the deceleration assistance control unexecuted.

In this embodiment, the forbiddance condition is satisfied when the left blinkers 40L are activated, and the allowed moving direction of the own vehicle moving lane does not include a left turn direction. Therefore, the forbiddance condition is not satisfied when the left blinkers 40L are activated, and the allowed moving direction of the own vehicle moving lane includes the left turn direction. The allowed moving direction is a direction in which the vehicle is allowed to move.

In other words, the forbiddance condition is satisfied when the left blinkers 40L are activated, and the own vehicle moving lane is a traffic lane for a through traffic, or when the left blinkers 40L are activated, and the own vehicle moving lane is a traffic lane for the through traffic and a right turn, or when the left blinkers 40L are activated, and the own vehicle moving lane is a right-turn-only lane. Thus, the forbiddance condition is not satisfied when the left blinkers 40L are activated, and the own vehicle moving lane is a traffic lane for the through traffic and a left turn, or when the left blinkers 40L are activated, and the own vehicle moving lane is a left-turn-only lane.

That is, the forbiddance condition is satisfied when the left blinkers 40L are activated, and the own vehicle moving lane is not a left-turn-allowed lane, and the forbiddance condition is not satisfied when the left blinkers 40L are activated, and the own vehicle moving lane is the left-turn-allowed lane.

In this embodiment, the traffic lane for the through traffic is a traffic lane in which the vehicle is allowed to move straight only. The traffic lane for the through traffic and the right turn is a traffic lane in which the vehicle is allowed to move straight and turn right. The right-turn-only lane is a traffic lane in which the vehicle is allowed to turn right only. Further, the traffic lane for the through traffic and the left turn is a traffic lane in which the vehicle is allowed to move straight and turn left. The left-turn-only lane is a traffic lane in which the vehicle is allowed to turn left only. Furthermore, the left-turn-allowed lane is a traffic lane in which the vehicle is allowed to turn left and includes the traffic lane for the through traffic and the left turn and the left-turn-only lane.

Further, In this embodiment, the forbiddance condition is satisfied when the right blinkers 40R are activated, and the allowed moving direction of the own vehicle moving lane does not include a right turn direction. Therefore, the forbiddance condition is not satisfied when the right blinkers 40R are activated, and the allowed moving direction of the own vehicle moving lane includes the right turn direction.

In other words, the forbiddance condition is satisfied when the right blinkers 40R are activated, and the own vehicle moving lane is the traffic lane for the through traffic, or when the right blinkers 40R are activated, and the own vehicle moving lane is the traffic lane for the through traffic and the left turn, or when the right blinkers 40R are activated, and the own vehicle moving lane is the left-turn-only lane. Thus, the forbiddance condition is not satisfied when the right blinkers 40R are activated, and the own vehicle moving lane is the traffic lane for the through traffic and the right turn, or when the right blinkers 40R are activated, and the own vehicle moving lane is the right-turn-only lane.

That is, the forbiddance condition is satisfied when the right blinkers 40R are activated, and the own vehicle moving lane is not a right-turn-allowed lane, and the forbiddance condition is not satisfied when the right blinkers 40R are activated, and the own vehicle moving lane is the right-turn-allowed lane.

In this embodiment, the right-turn-allowed lane is a traffic lane in which the vehicle is allowed to turn right and includes the traffic lane for the through traffic and the right turn and the right-turn-only lane.

Therefore, the forbiddance condition is satisfied when the blinkers 40 are activated, and the turning direction of the vehicle 100 indicated by the activated blinkers 40 is not included in the allowed moving direction of the own vehicle moving lane. On the other hand, the forbiddance condition is not satisfied when the blinkers 40 are activated, and the turning direction of the vehicle 100 indicated by the activated blinkers 40 is included in the allowed moving direction of the own vehicle moving lane.

In this embodiment, the vehicle control apparatus 10 detects road surface arrow signs, based on the surrounding detection information IS and determines the allowed moving direction of the own vehicle moving lane, based on the detected road surface arrow signs. The road surface arrow signs which the vehicle control apparatus 10 detects, are ones provided on the own vehicle moving lane ahead of the vehicle 100.

Further, in the embodiment described above, the vehicle control apparatus 10 does not execute the deceleration assistance control when the deceleration assistance condition is satisfied, and the allowance condition is not satisfied. In this regard, the vehicle control apparatus 10 may be configured to execute the deceleration assistance control of a deceleration assistance level (i.e., a level of assisting the deceleration of the vehicle 100 by the deceleration assistance control) lower a normal deceleration assistance level (i.e., the deceleration assistance level when the deceleration assistance condition and the allowance condition are both satisfied) when the deceleration assistance condition is satisfied, and the allowance condition is not satisfied.

In other words, the vehicle control apparatus 10 may be configured to execute the deceleration assistance control, setting the deceleration assistance level to a first level when the deceleration assistance condition and the allowance condition are both satisfied, and execute the deceleration assistance control, setting the deceleration assistance level to a second level lower than the first level when the deceleration assistance condition is satisfied, and the allowance condition is not satisfied. It should be noted that the second level may be the deceleration assistance level that the deceleration assistance control is not executed.

In other words, the vehicle control apparatus 10 may be configured to execute the deceleration assistance control of the deceleration assistance level lower than the deceleration assistance level set for a case that the deceleration assistance condition and the forbiddance condition are both satisfied when the deceleration assistance condition is satisfied, and the allowance condition is not satisfied.

As a process to lower the deceleration assistance level, a process to execute one of the autonomous deceleration control and the deceleration notification control as the deceleration assistance control of the second level may be employed when the autonomous deceleration control and the deceleration notification control are both executed as the deceleration assistance control of the first level.

Further, the vehicle control apparatus 10 may be configured to execute the deceleration assistance control of a third level lower than the first level when the target point distance D is longer than the assistance determination start distance D1.

Furthermore, in this embodiment, the vehicle control apparatus 10 is configured to continue executing the deceleration assistance control without stopping executing the deceleration assistance control even when a condition such as the forbiddance condition described above for forbidding starting to execute the deceleration assistance control, becomes satisfied after stopping executing the deceleration assistance control.

<Specific Operations of Vehicle Control Apparatus>

Figure 5:
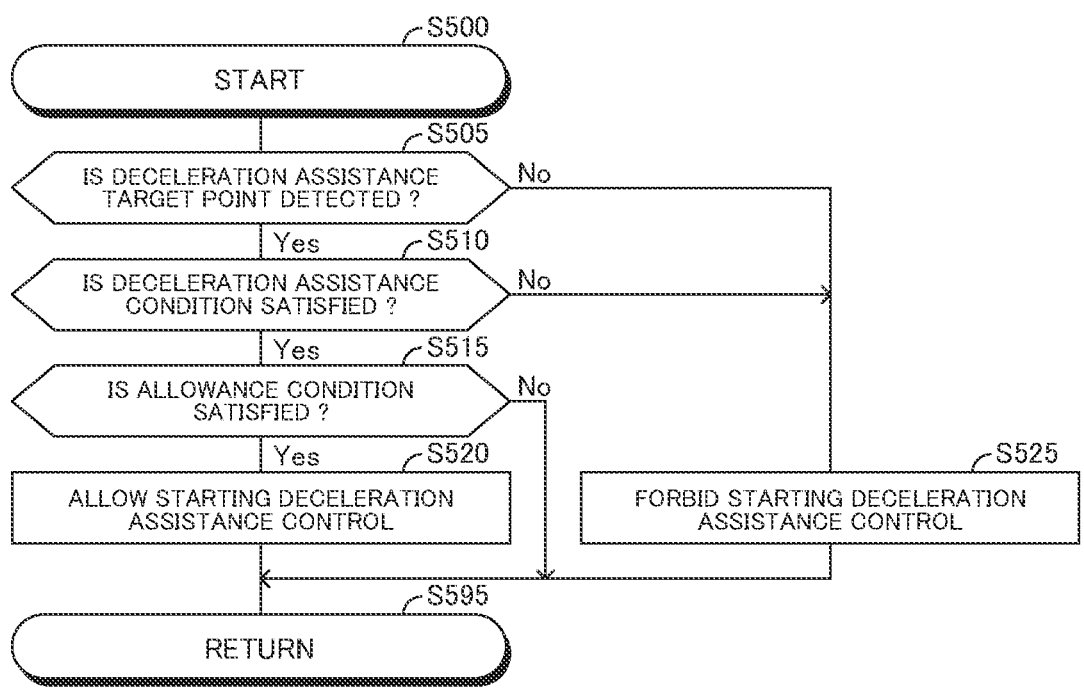
FIG. 5 is a view which shows a flowchart of a routine executed by the vehicle control apparatus according to the embodiment of the invention.

Next, specific operations of the vehicle control apparatus 10 will be described. The vehicle control apparatus 10 is configured to execute a routine shown in FIG. 5 with a predetermined calculation cycle. Thus, at a predetermined timing, the vehicle control apparatus 10 starts a process from a step S500 of the routine shown in FIG. 5 and proceeds with the process to a step S505 to determine whether the deceleration assistance target point 300 is detected.

When the vehicle control apparatus 10 determines "Yes" at the step S505, the vehicle control apparatus 10 proceeds with the process to a step S510 to determine whether the deceleration assistance condition is satisfied. When the vehicle control apparatus 10 determines "Yes" at the step S510, the vehicle control apparatus 10 proceeds with the process to a step S515 to determine whether the allowance condition is satisfied. When the vehicle control apparatus 10 determines "Yes" at the step S515, the vehicle control apparatus 10 proceeds with the process to a step S520 to allow executing the deceleration assistance control. In this case, the vehicle control apparatus 10 executes the deceleration assistance control. Then, the vehicle control apparatus 10 proceeds with the process to a step S595 to terminate executing this routine once.

On the other hand, when the vehicle control apparatus 10 determines "No" at the step S515, the vehicle control apparatus 10 proceeds with the process directly to the step S595 to terminate executing this routine once. In this case, the vehicle control apparatus 10 does not execute the deceleration assistance control.

Further, when the vehicle control apparatus 10 determines "No" at the step S505 or the step S510, the vehicle control apparatus 10 proceeds with the process to a step S525 to forbid starting to execute the deceleration assistance control. In this case, when the vehicle control apparatus 10 does not execute the deceleration assistance control, the vehicle control apparatus 10 does not start to execute the deceleration assistance control. On the other hand, when the vehicle control apparatus 10 executes the deceleration assistance control, the vehicle control apparatus 10 continues executing the deceleration assistance control. Then, the vehicle control apparatus 10 proceeds with the process to the step S595 to terminate executing this routine once.

The specific operations of the vehicle control apparatus 10 have been described.

What is claimed is:

1. A vehicle deceleration assistance apparatus, comprising an electronic control unit configured to execute a deceleration assistance control to assist a deceleration of a vehicle before the vehicle arrives at a deceleration assistance target point where the vehicle can turn left or right,
   wherein the electronic control unit is configured to:
      execute the deceleration assistance control, setting a deceleration assistance level of assisting the deceleration of the vehicle by the deceleration assistance control to a first level when a first condition is satisfied, blinkers of the vehicle are activated, and a second condition is satisfied,
         the first condition being a condition that a target point distance between the vehicle and the deceleration assistance target point is equal to or shorter than a first distance,
         the second condition being a condition that the target point distance is equal to or longer than a second distance shorter than the first distance; and
      execute the deceleration assistance control, setting the deceleration assistance level to a second level lower than the first level when the first condition is satisfied, the blinkers are activated, and the second condition is not satisfied.

2. The vehicle deceleration assistance apparatus as set forth in claim 1, wherein the electronic control unit is configured to increase the second distance when the first condition is satisfied, the blinkers are activated, and a traffic light ahead of the vehicle lights a yellow light.

3. The vehicle deceleration assistance apparatus as set forth in claim 1, wherein the electronic control unit is configured to increase the second distance when the first condition is satisfied, the blinkers are activated, and there is an entrance of a parking lot over the deceleration assistance target point.

4. The vehicle deceleration assistance apparatus as set forth in claim 1, wherein the electronic control unit is configured to execute the deceleration assistance control, setting the deceleration assistance level to a third level lower than the first level when the first condition is not satisfied, and the blinkers are activated.

5. The vehicle deceleration assistance apparatus as set forth in claim 4, wherein the electronic control unit is configured to increase the first distance such that the first distance for a higher moving speed of the vehicle is longer than the first distance for the lower moving speed of the vehicle.

6. A vehicle deceleration assistance method of executing a deceleration assistance control to assist a deceleration of a vehicle before the vehicle arrives at a deceleration assistance target point where the vehicle can turn left or right,
   wherein the vehicle deceleration assistance method comprises steps of:
      executing the deceleration assistance control, setting a deceleration assistance level of assisting the deceleration of the vehicle by the deceleration assistance control to a first level when a first condition is satisfied, blinkers of the vehicle are activated, and a second condition is satisfied,
         the first condition being a condition that a target point distance between the vehicle and the deceleration assistance target point is equal to or shorter than a first distance,
         the second condition being a condition that the target point distance is equal to or longer than a second distance shorter than the first distance; and
      executing the deceleration assistance control, setting the deceleration assistance level to a second level lower than the first level when the first condition is satisfied, the blinkers are activated, and the second condition is not satisfied.

7. A non-transitory computer-readable storage medium storing vehicle deceleration assistance executable instructions configured to execute a deceleration assistance control to assist a deceleration of a vehicle before the vehicle arrives at a deceleration assistance target point where the vehicle can turn left or right,
   wherein the vehicle deceleration assistance executable instructions stored on the computer-readable storage medium are configured to:
      execute the deceleration assistance control, setting a deceleration assistance level of assisting the deceleration of the vehicle by the deceleration assistance control to a first level when a first condition is satisfied, blinkers of the vehicle are activated, and a second condition is satisfied,
         the first condition being a condition that a target point distance between the vehicle and the deceleration assistance target point is equal to or shorter than a first distance,
         the second condition being a condition that the target point distance is equal to or longer than a second distance shorter than the first distance; and
      execute the deceleration assistance control, setting the deceleration assistance level to a second level lower than the first level when the first condition is satisfied, the blinkers are activated, and the second condition is not satisfied.

* * * * *